C. W. VON DORN.
FLY TRAP.
APPLICATION FILED SEPT. 18, 1912.

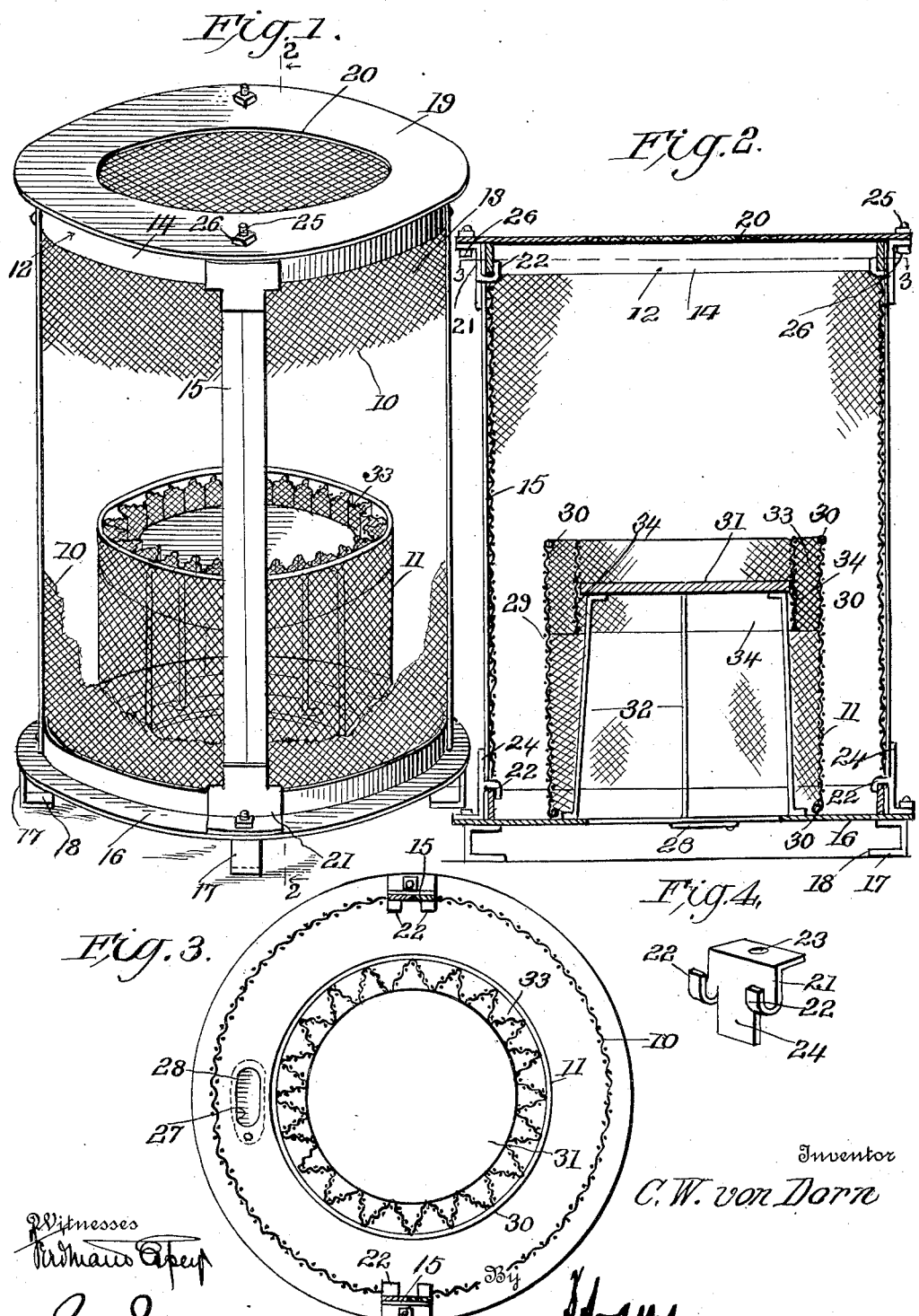

1,089,513.

Patented Mar. 10, 1914.
2 SHEETS—SHEET 2.

Inventor
C. W. von Dorn

Witnesses

By

Attorneys.

UNITED STATES PATENT OFFICE.

CALVIN W. von DORN, OF ALBUQUERQUE, NEW MEXICO, ASSIGNOR OF ONE-THIRD TO CECIL K. SCHAFER, OF NACO, ARIZONA.

FLY-TRAP.

1,089,513.  Specification of Letters Patent.  Patented Mar. 10, 1914.

Application filed September 18, 1912. Serial No. 721,037.

*To all whom it may concern:*

Be it known that I, CALVIN W. VON DORN, citizen of the United States, residing at Albuquerque, in the county of Bernalillo and State of New Mexico, have invented certain new and useful Improvements in Fly-Traps, of which the following is a specification.

My invention relates to new and useful improvements in fly traps and more especially to that type including an outer body or casing formed of foraminous material and an inner body or casing also formed of foraminous material and spaced from the walls of the first, with its open lower end in registration with an opening formed in the bottom of the first and with openings in its upper end to permit the passing of the flies into the outer casing.

One of the primary objects of my invention is to provide a fly trap which is so constructed as to adapt it for use in catching flies before they enter the building and which, for this reason, will be made upon a comparatively large scale and in such shapes as to render it easy to handle and locate.

A further object of my invention is to provide a novel form of entrance from the inner casing to the outer casing which will not in any way interfere with the flies passing into the outer casing, but which will effectually check their return. And a still further object of my invention is to so construct the outer or larger casing that it may be readily taken apart for shipment or storage, being capable of being packed in a relatively small space when so disassembled.

With these and other objects in view, my invention will be more fully described, illustrated in the accompanying drawings, and then specifically pointed out in the claims which are attached to and form a part of this application.

Figure 5:
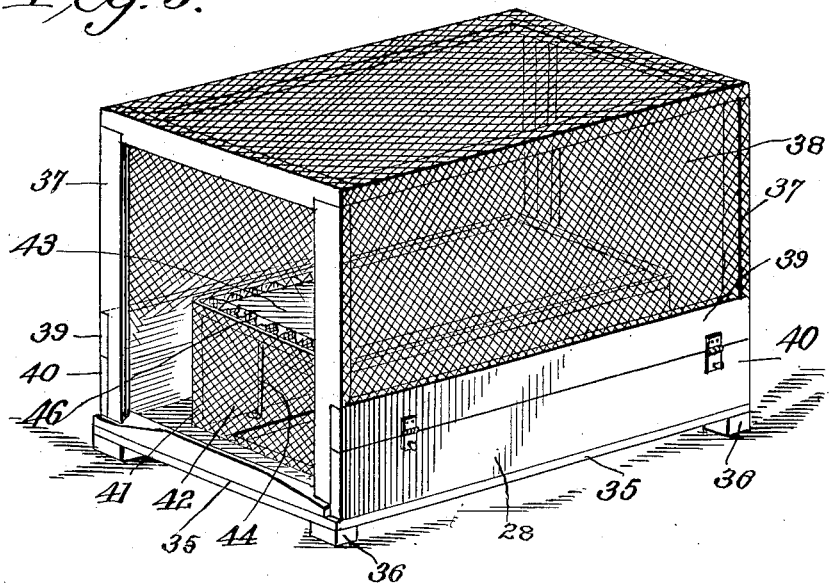
Figure 6:
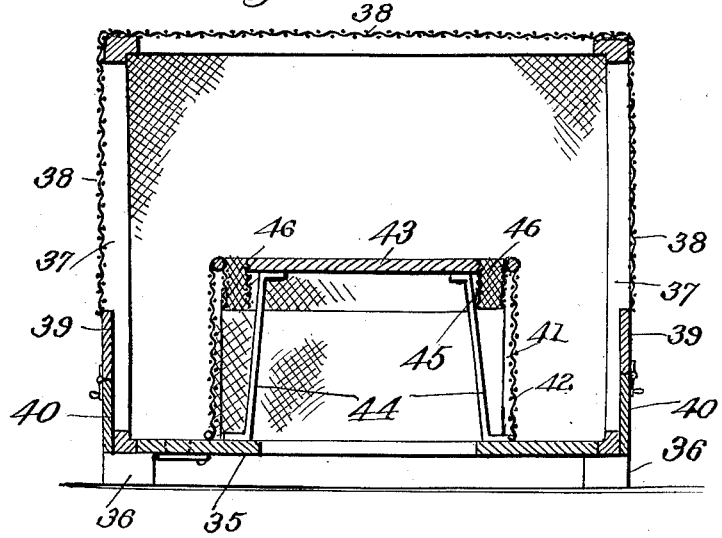

In the drawings: Figure 1 is a perspective view of my improved fly trap, parts of the outer casing being broken away to more clearly show its construction; Fig. 2 is a central vertical section taken through the fly trap shown in Fig. 1 and upon the line 2—2 thereof; Fig. 3 is a section on the line 3—3 of Fig. 2; Fig. 4 is a detail perspective view of one of the clamps employed in assembling the outer casing; Fig. 5 is a perspective view of a slightly modified form of trap construction; Fig. 6 is a vertical transverse sectional view of the construction shown in Fig. 5.

Corresponding and like parts are referred to in the following description and indicated in all the views of the accompanying drawings by the same reference characters.

The preferred embodiment of my invention includes an outer casing 10 closed at its upper end and partially closed at its lower end, and an inner casing 11 positioned in spaced relation within the outer casing with its open lower end registering with the opening in the bottom of the outer casing and with its upper end closed with the exception of a plurality of passages to permit the flies to pass from the inner to the outer casing.

More specifically, the outer casing is composed of two symmetrical body portions, each consisting of a frame 12, preferably formed of sheet metal and provided with a covering of wire netting or other suitable foraminous material 13. Each of the frames 12 includes spaced upper and lower frame members 14 bent longitudinally into the form of a semicircle and secured in parallel relation to each other by means of spaced strips 15 connected by their free ends to the free ends of the strips 14. The lower end or bottom of this outer casing consists of an annular ring of sheet metal 16, the central opening of which forms an entrance to the casing. In order to support this ring 16 above the ground, I have provided supporting legs 17 which are secured to the under face of the ring 16 and the lower ends of which are preferably bent inwardly as shown at 18 to extend beneath the trap.

The top of the outer casing consists of a second annular ring 19, the central opening of which is covered by a netting 20. The body members 12 of the outer casing are secured to each other and to the rings 16 and 19 by means of a plurality of clamps 21. Each of these clamps, as best shown in Fig. 4 of the drawings, consists of a substantially L-shaped plate of metal, one arm of which is slitted longitudinally to provide tongues which are bent outwardly into spaced relation to the body member to form spaced hooks 22 and the other arm of which is provided with a bolt receiving perforation 23.

In assembling the parts, the frame members 15 of the body sections are brought together as shown in Fig. 1 of the drawings and the hooks 22 are passed inwardly about the frame members 14 in such a manner that the portions 24 of the clamps bear against the outer faces of the frame members 15, while the perforated arms of the clamps bear against the rings 16 or 19 to which they are secured by means of bolts 25 passed through the perforations 23 and perforations formed in the rings and secured in place by nuts 26. The hooks 22 and body portions 24 of the clamps are so proportioned that when the hooks engage the frame members 14, the frame members 15 are held with their opposed edges in close engagement with each other, as shown.

The annular ring 16 forming the base of the outer casing is provided with an opening 27 through which the flies caught in the trap may be removed, this opening being normally closed by a door 28. Mounted within this outer casing, is an inner casing comprising a cylindrical body portion formed of wire netting and indicated by the numeral 29, the upper and lower edges of this body member being reinforced by wire rings 30, one of which seats upon the upper face of the ring 16. This inner casing is so proportioned that when in position, its walls are spaced from the walls of the outer casing. This inner casing is provided with a circular top 31, preferably formed of wood or sheet metal and supported by means of legs 32, the lower ends of which rest upon the ring 16. This top plate 31 is so proportioned as to provide an annular space between its edge and the upper edge of the inner casing 29 and interposed in this space and encircling the plate 31, is a baffle member 33 formed from a strip of wire netting crimped transversely and secured by its angular edges between the inner face of the inner casing 29 and the outer face of an inwardly projecting annular flange 34 carried by the plate 31 and also formed of netting. The space between the top plate 31 and inner casing 29 is relatively narrow and the crimped baffle member serves to further reduce this space and to divide it into a plurality of separate passageways from the inner to the outer casing, the screen extending above the top 31.

In operation, the trap is positioned upon the ground or other suitable support, being held in raised position above the same by the supporting legs 17. The flies pass beneath the ring 16 forming the bottom of the trap and upwardly through the opening in this ring into the inner casing 11, being attracted by the light above them. They then follow up the inner face of the wall of this casing and through the passageways provided between the wall and the top plate 31 into the outer casing, the light coming through the space between the inner casing wall and plate causing them to follow up the wall.

When once in the outer casing, the flies are trapped for it is a well known fact that flies will not fly downwardly through an opening and they therefore pay no attention to the passages through which they have entered. From time to time the flies contained in the trap may be killed in any suitable manner and removed from the trap through the opening 27.

If desired, any suitable form of baiting material may be placed in either the inner or outer casings to attract the flies to the trap.

In Figs. 5 and 6 of the drawings I have illustrated a slightly modified form of trap construction embodying the same general principles. In these figures 35 indicates an open rectangular frame, preferably of wood, and forming the base of the trap, being supported above the ground by legs 36. Secured upon this base, is a parallelepiped shaped frame 37 also formed of wood and having its walls covered with netting 38. The netting is omitted from the lower portions of the side walls of this frame and replaced by longitudinally extending frame braces 39 carrying hinged doors 40 through which the flies may be removed. Positioned within this outer casing, is an inner casing 41 seated by its open lower end upon the base 35 and conforming in shape to the outer casing. The frame of this inner casing is also covered with netting 42 and its upper end is partially closed by a top 43, the edges of which are spaced from the upper edges of the walls of the inner casing, this top being supported in place by legs 44. The top 43 is provided with a downwardly depending peripheral flange 45 formed of netting and the space between this flange and the wall of the inner casing is partially blocked by a crimped baffle 46, similar to the baffle member 33 of the form shown in Figs. 1 to 4 of the drawings. The operation of this form of trap is identical with that of the form previously described and any further explanation of the same is therefore unnecessary.

It will of course be understood that I do not wish in any way to limit myself to the specific details of construction or the exact shape of inner and outer casings herein shown and described. In fact a cylindrical inner casing could well be employed with a parallelepiped shaped outer casing or the reverse, without in the slightest degree departing from the spirit of my invention.

Having thus described the invention, what is claimed as new is:

1. A fly trap including an outer frame having a covering of foraminous material, a base for said frame provided with an opening, an inner frame having a covering of foraminous material and with its ends open, one end of the inner frame resting upon the base of the outer casing and about its opening, and an opaque top for the inner frame supported within the upper end thereof and in spaced relation to the free edge thereof to provide an annular passage between the inner and outer frames.

2. A fly trap including a frame having a covering of foraminous material forming a casing provided with an opening in its lower end, a second frame having a covering of foraminous material providing a second casing positioned within the first and seated by its lower end upon the lower end of the first, the ends of said second casing being open, an opaque top for said second casing supported within the upper end thereof and with its edges in spaced relation to the free edge of the second casing, and a crimped baffle member of foraminous material encircling said top and extending between it and the second casing to provide a plurality of passages from the second casing to the first.

3. A fly trap including an annular base, an annular top, and semicylindrical body members, means for securing the body members to each other and also to the base and top to provide an outer casing, and an inner casing positioned within the outer casing and provided with a plurality of restricted passages communicating between the two casings.

4. A fly trap including an annular base, an annular top, and body members, each comprising spaced apart longitudinally bowed semicircular frame members connected by parallel side members to form frames, a covering of foraminous material for said frames, means for securing said frames to each other and to the top and base, said means including a plurality of L-shaped plates, each secured by one arm to the top or base and having their free arms slitted to form tongues bent into hooks to engage the bowed frame members at points adjacent the side frame members, means for supporting the base in raised position, and an inner casing of foraminous material positioned within the first casing and provided with a plurality of restricted passages communicating with the first casing.

5. A fly trap including an outer frame having a covering of foraminous material, a base having an opening, an inner frame having a covering of foraminous material and with its ends open, one end of the inner frame resting upon the base of the outer frame and about its opening, an imperforate opaque top for the inner frame spaced within the frame and below the upper end thereof, and a crimped baffle member encircling said top between it and the covering of the inner frame, said baffle member extending both below and above the top of the inner frame.

In testimony whereof I affix my signature in presence of two witnesses.

CALVIN W. von DORN. [L. s.]

Witnesses:
R. F. HELLER,
D. A. GOMEZ.

---

Copies of this patent may be obtained for five cents each, by addressing the "Commissioner of Patents, Washington, D. C."